United States Patent  [15] 3,687,529
Goshima et al.  [45] Aug. 29, 1972

[54] APPARATUS FOR PRESENTING AUDIO AND VISUAL INFORMATIONS

[72] Inventors: Takeshi Goshima; Yasutaka Iwawaki, both of Tokyo, Japan

[73] Assignee: Canon Kabushiki Kaisha, Tokyo, Japan

[22] Filed: Jan. 15, 1971

[21] Appl. No.: 106,712

[30] Foreign Application Priority Data

Jan. 20, 1970  Japan ........................ 45/5582

[52] U.S. Cl. ................................................ 352/27
[51] Int. Cl. ............................................ G03b 31/02
[58] Field of Search ............ 352/5, 25, 26, 27, 29, 30

[56] References Cited

UNITED STATES PATENTS 3,049,965  8/1962  Gunst ........................ 352/27
3,591,266  7/1971  Ried ............................. 352/5

Primary Examiner—Samuel S. Matthews
Assistant Examiner—Michael L. Gellner
Attorney—Ward, McElhannon, Brooks & Fitzpatrick

[57] ABSTRACT

Apparatus capable of selective display in sequence of a series of visual presentations or a selected still visual presentation and reproducing audio information associated with the displayed visual presentations or presentation, comprising a projector head, and control means to present continuously a series of pictures or a still picture, and a magnetic sound head adapted to reproduce audio signals from a magnetic sound track of a film strip when the latter is transported for continuous series picture projection, or to transfer the reproduced audio signals to an endless tape for playback when the film is stopped for still picture projection.

7 Claims, 4 Drawing Figures

APPARATUS FOR PRESENTING AUDIO AND VISUAL INFORMATIONS

BACKGROUND OF THE INVENTION

The present invention relates to generally an apparatus for presenting audio and visual informations and more particularly an apparatus for presenting audio and visual information of the type in which the audio and sound information associated with a picture being displayed may be repetitively reproduced.

The audio-visual education or instruction is very useful and highly effective not only in individual learning but also in group instruction for various educational purposes because the audio-visual materials are represented through the senses of hearing and sight. The methods and materials employed by the audio-visual education not only for displaying visual materials or pictures but also for reproducing the sound information associated with a series of pictures being displayed, include the sound motion pictures including the optical or magnetic sound tracks, the soundless 16- or 8-mm cine-projectors, slide projectors used in conjunction with the magnetic tape recorders, the video tape recorders of the type in which the video and audio signals recorded upon a magnetic tape may be reproduced, and the like.

In such apparatus, the sound information associated with the pictures being displayed is reproduced. However, it is sometimes desired to stop a particular picture for a longer time so as to be observed closely. For this purpose, some cine-projectors are provided with a mechanism for permitting the still or stationary picture display or projection so that any desired picture frame of a film strip may be projected still or stationary for closer observation. In this case, the pull-down mechanism of the cine-projector is stopped so that the no film strip is transported. In consequence the sound or audio signals recorded upon the sound track of the film strip will not be reproduced. In other words, even though a visual material or picture is displayed, no audio or sound information is given so that the viewers must recall in their minds what have been said or explained about this particular still picture in conjunction with the previously displayed moving pictures. Same is true for other audiovisual apparatus such as magnetic video tape recorders. For the display of a still picture, the magnetic tape must be stopped so that the audio signals recorded upon the same magnetic tape are not reproduced. That is, there is no audio information about the picture displayed still or stationary.

It is therefore one of the objects of the present invention to provide an apparatus for presenting audio and visual informations in which even when a desired picture is displayed or projected still the audio or sound information about this picture may be reproduced.

Another object of the present invention is to provide an apparatus for presenting audio and visual informations in which even when a desired picture is displayed still or stationary the audio information about this still picture may be repetitively reproduced as many times as desired.

Another object of the present invention is to provide an apparatus for presenting audio and visual informations which is capable of displaying or projecting a still picture while the audio information about this still picture may be repetitively reproduced as many times as desired and thereafter automatically setting into an operative position in which a series of pictures may be displayed or projected continuously.

Another object of the present invention is to provide an apparatus for presenting audio and visual informations which has a recording medium upon which are recorded visual or video information and an endless magnetic recording medium for recording thereupon the audio signals reproduced in conjunction with the reproduced video information signals so that the audio signals recorded upon or transferred to the endless magnetic recording medium may be repetitively reproduced when a desired picture is displayed or projected still.

SUMMARY OF THE INVENTION

In brief, the present invention provides an improved apparatus for presenting audio and visual informations comprising picture reproduction means for reproducing pictures recorded upon a picture or video information recording medium, audio or sound information transfer means for transferring upon an endless magnetic recording medium the audio or sound informations audio or sound information reproduction means, and control means coupled to said audio or sound information transfer means.

According to one aspect of the present invention both of picture and sound information signals may be recorded upon a common recording medium.

According to another aspect of the present invention, the pictures are recorded in a series of continuous picture frame forms upon the common recording medium while the audio or sound informations are recorded upon the common recording medium in such a way that the audio or sound informations may be reproduced simultaneously when the pictures associated with the audio or sound informations are reproduced.

The present invention will become more apparent from the following description of the preferred embodiments thereof taken in conjunction with the accompanying drawing.

DESCRIPTION OF THE PREFERRED EMBODIMENTS

The preferred embodiments of the present invention will be described hereinafter as being applied to a cine projector of the type using a film strip shown in FIG. 3.

Figure 1:
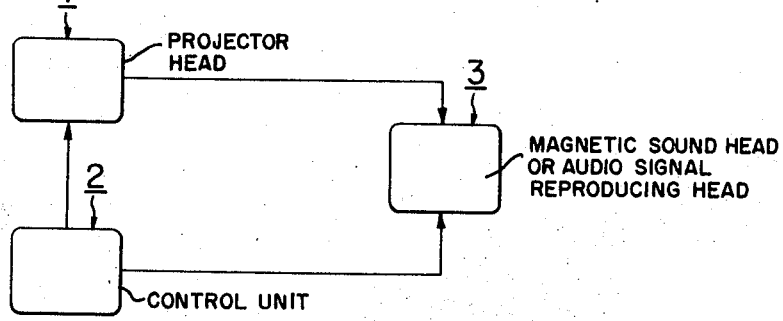
FIG. 1 is a block diagram of an apparatus in accordance with the present invention.

The apparatus for presenting audio and visual informations in accordance with the present invention may be divided into three major sections or blocks as shown in FIG. 1. A projector head 1 includes a mechanism permitting the projection of a still or stationary picture;

a control unit 2 is adapted to control the apparatus in response to the depression of control buttons or control signals applied thereto from a suitable equipment outside of the apparatus; and a magnetic sound head or audio signal reproducing head 3 has a double function. One function is to reproduce the audio signals recorded in the magnetic sound track of a film strip when the latter is normally transported for continuous-picture projection, through a magnetic reproduce head in contact with the sound track. The other function is to transfer the reproduced audio signals upon an endless magnetic tape so as to playback or reproduce them when the film strip is stopped for still or stationary projection as will be described in more detail hereinafter.

Figure 2:
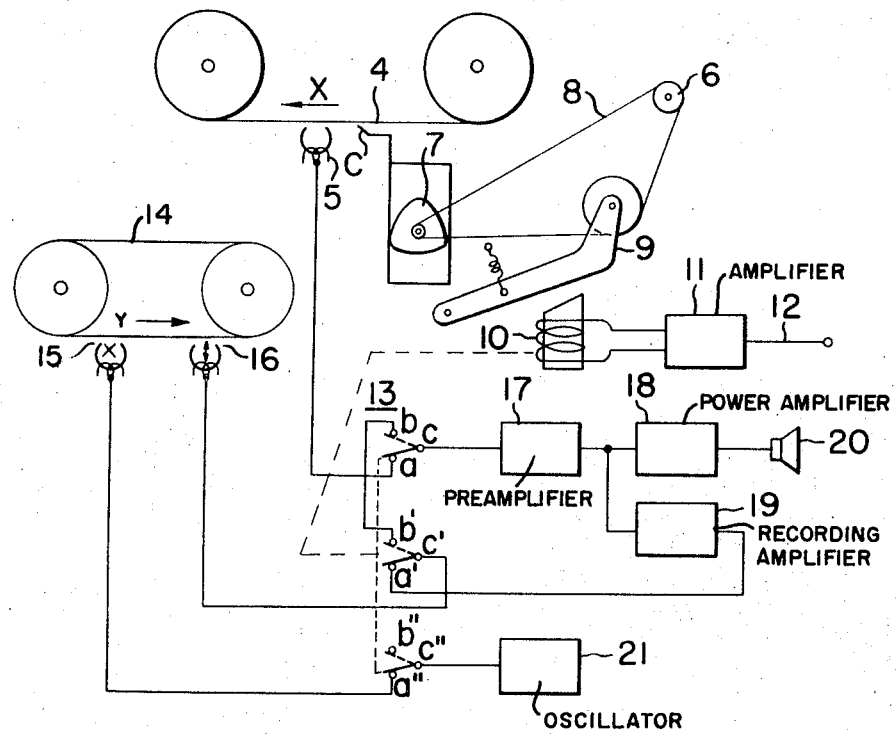
FIG. 2 is a schematic diagram illustrating a first embodiment of the present invention.

Referring to FIG. 2, the essential parts of the apparatus in accordance with the present invention will be described in detail. The film strip 4 having the magnetic sound track as best shown in FIG. 3 is transported in the direction indicated by the arrow $x$ from a payoff reel to a takeup reel and the reproduced head 5 is made in contact with the magnetic sound track. The power for transporting the film strip 4 is transmitted from a drive pulley 6 coupled to a suitable power source (not shown). A belt 8 is wrapped around the drive pulley 6, a pull-down cam 7 and an by a spring biased lever 9, which is attracted by a plunger 10 when it is energized, so that the belt 8 is tensioned so as to transmit the power from the drive pulley 6 to the pull-down cam 7. The current energizing the plunger 10 is supplied from a plunger-drive amplifier 11 which is electrically coupled to the control unit 2 through a lead wire 12.

Figure 3:
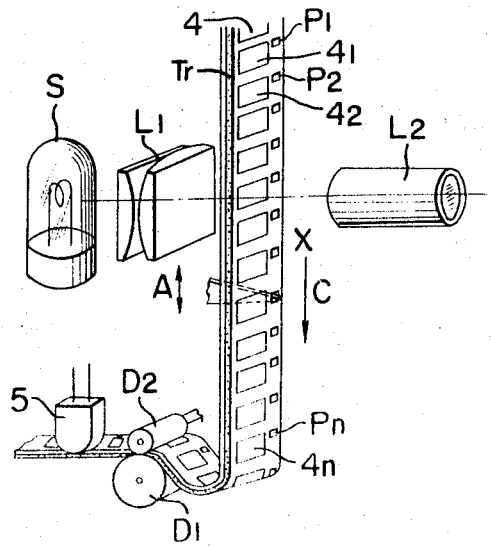
FIG. 3 is a perspective view of a film strip upon which are recorded both of the audio and video signals and which may be applied to the embodiment shown in FIG. 2.

As shown in FIG. 3, the video information or pictures to be displayed $4_1$, $4_2$ and so on are optically recorded upon the film strip 4 and the audio signal or information associated with these video information or pictures is recorded in the magnetic sound track Tr on the left side edge of the film strip 4. A claw C of the pull-down mechanism engages with the perforation holes of the film strip 4 to pull it down one frame at a time. The video information may be projected through an optical projection system consisting of a light source S, a condenser lens $L_1$ and a projection lens $L_2$ while the film strip 4 is intermittently transported by the pull-down claw C in a manner well known in the art while the audio information on the magnetic sound track Tr is reproduced through the magnetic head 5. The pull-down claw C is moved up and down in the direction indicated by the double-pointed arrow A upon rotation of the pull-down cam 7 so as to engage with hole in its downstroke movement to thereby pull down the film strip 4 through the gate in the direction $x$.

A capstan or rotary stabilizer drum $D_1$ rotates at a constant angular speed so as to advance the film strip 4 past the magnetic head 5 at a constant speed and the film strip 4 is pressed against the capstan or rotary stabilizer drum $D_1$ by a pinch roller $D_2$. Therefore, the intermittent motion of the film strip 4 due to the pull-down operation by the pull-down claw C and the ripple motion due to the sprocket wheels or the like may be isolated so as to permit the transportation of the film strip 4 at a constant speed in the audio signal reproducing head 3.

Referring back to FIG. 2, a relay 13 is coupled to the plunger 10 in such a manner that upon energization of the latter the contacts 2, $a'$ and $a''$ may be closed as shown in FIG. 2. The endless tape 14 is transported in the direction indicated by the arrow Y in contact with an erase and record-reproduce heads 15 and 16. The output of a preamplifier 17 is applied to both of a power amplifier 18 for operating a loud-speaker 20 and a recording amplifier 19 for recording a portion of the output signals from the preamplifier 17 upon the endless tape 14. The erasing or bias current is supplied to the erase head 15 from a high-frequency oscillator 21.

When a signal is applied to the line 12 for continuous projections from the control unit 2, the signal is amplified by the plunger-drive-amplifier 11 and then applied to the plunger 10 to energize it so that the lever 9 is attracted by the plunger 10. The can 7 rotates claw C reciprocates in the direction of A so as to transport the film strip 4 in the direction of $x$. Upon energization of the plunger 10, the contacts $a$, $a'$ and $a''$ of the relay 13 are closed as shown so that the signals from the reproduce head 5 are applied to the preamplifier 17 through the contacts 13$ac$ and then to the power amplifier 18 so as to be reproduced through the loudspeaker 20. That is, the audio informations associated with the vide information being projected are now reproduced. In this case, the movable contact $C''$ of the relay 13 closes the contact $a''$ so that the erasing or bias current is supplied to the erase head 15 from the oscillator 21, and the signals from the preamplifier 17 are also recorded upon the endless tape 14 through the recording-amplifier 19, the contacts 13$a'c'$ and the recording head 16.

When a signal for still or stationary projection is transmitted through the line 12 to the plunger-drive amplifier 11, the plunger 10 is de-energized so that the contacts $b$, $b'$ and $b''$ of the relay 13 are closed as indicated by the broken lines in FIG. 2. Since the lever 9 is sprung back by its spring so that the tension of the belt 8 is relaxed, the power is not transmitted to the pull-down cam 7 from the drive pulley 6. In consequence the film strip is held still or stationary so that a still picture is projected. The reproduce head 5 is disconnected from the preamplifier while the reproduce head 16 of the endless tape 14 is connected to the preamplifier 17 through the closed contacts $b'$ and $b$ so that the signals recorded upon the endless tape 14 are now reproduced through the power amplifier 18 and the loudspeaker 20. In this case the audio information to be reproduced is that recorded during a time interval substantially equal to that required for the endless tape 14 to make one revolution immediately before the plunger 10 is de-energized. Even though the still picture projected is disconnected from the series of previously projected pictures, the audio information associated with these previously projected pictures may be reproduced in conjunction with the still picture being projected so that the students or trainees may recall in their minds what they have just seen. The audio information on the endless tape 14 may be reproduced repetitively as long as the still picture is being projected.

Figure 4:
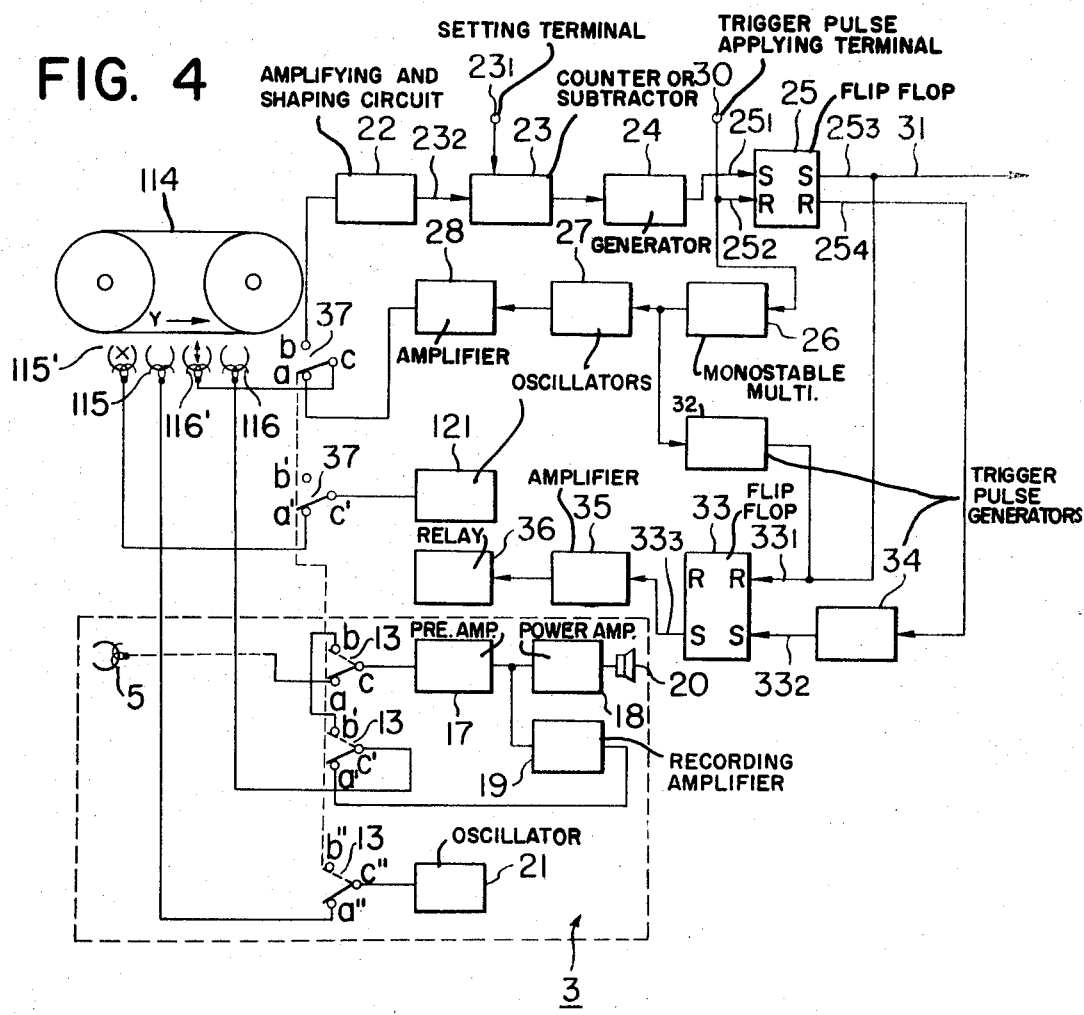
FIG. 4 is a block diagram of a second embodiment of the present invention.

FIG. 4 illustrates another embodiment of the control unit 2 which further incorporates a mechanism for automatically returning the apparatus to its continuous projection position from its still projection position. An endless tape 114 which corresponds to the endless tape 14 in FIG. 2 has a audio-information-transfer-track in contact with an erase head 115 and record-reproduce head 116 and a control-signal-recording track in contact with an erase head 115' and a record-reproduce head 116'. The erase and record-reproduce heads 115 and 116 correspond to the erase and record-reproduce heads 15 and 16 in FIG. 2 respectively. The erase or bias current is supplied to the erase head 115' from an oscillator 121 which corresponds to the oscillator 21 in FIG. 2. The control signal picked up by the record-reproduce head 116' is amplified and reshaped by a circuit 22 so as to generate a pulse to be applied through a line $23_2$ to a counter or subtractor 23. The subtractor 23 has a setting terminal $23_1$ coupled to a setting button or a suitable equipment (not shown) for setting the desired number of repetitive reproductions of the endless tape 114. In other words, a number of pulses representing the desired number of repetitive reproductions of the endless tape 114 are generated by the setting button or other suitable pulse generating means and entered into the subtractor 23 from the setting terminal $23_1$. When the control signal that is recorded upon the control signal recording track upon the endless tape 114 as will be described in more detail hereinafter is reproduced, one pulse is fed into the subtractor through the lead $23_2$ from the circuit 22. In other words, every time the control signal is reproduced, one pulse is applied to the subtractor 23 so that one pulse is subtracted from the number of pluses entered therein in the manner described above. When the content of the subtractor 23 becomes zero, one pulse is generated by a trigger pulse generator 24 and is then applied to a flip-flop 25, which has a set and reset terminals $25_1$ and $25_2$ and a set and reset output terminals $25_3$ and $25_4$. The reset terminal $25_2$ is connected to a terminal 30 to which is applied a trigger pulse generated by a trigger pulse generator (not shown) which is actuated in response to the switching of the inventive apparatus from its continuous-picture-projection position to its still-picture-projection position, so that the flip-flop 25 is reset. The reset output terminal $25_3$ is connected to the line 12 shown in FIG. 2 through a line 31. The reset terminal $25_2$ and the terminal 30 are connected to a monostable multivibrator 26 which is adapted to the driven into the transition state for a predetermined time interval when the trigger pulse is applied from the terminal 30. When the monostable multivibrator 26 is driven into the transition stage, an oscillator 27 is actuated so as to generate a control signal with a constant level and frequency, which may be amplified by an amplifier 28. The amplifier 28 is selectively connected to the record-reproduce head 116' through the contacts 37a and 37c of a relay 36 so that a square waveform control signal may be recorded upon the control signal recording track of the endless tape 141 by the oscillator 27 and the amplifier 28. The length or duration of the square waveform control signal is equal to the transition time of the monostable multivibrator 26.

The output terminal of the monostable multivibrator 26 is also connected to a trigger pulse generator 32 which is adapted to generate a trigger pulse at the instant the monostable multivibrator 26 is returned to its normal state from its transition state. Another flip-flop 33 has a set and reset terminals $33_2$ NAND $33_1$ which in turn are connected to the output terminals of a trigger pulse generator 34 and the trigger pulse generator 32 respectively. The input terminal of the trigger pulse generating circuit 34 is connected to the set output terminal $25_3$ of the flip-flop 25 so that a trigger pulse is generated when the flip-flop 25 is set for setting the flip-flop 33. The set output signal derived from the set output terminal $33_3$ of the flip-flop 33 is used to actuate the relay 36 after amplified by an amplifier 35. The movable contacts 37c and 37c' of the relay 36 are normally made in contact with the fixed contacts a a' as shown in FIG. 4.

Next the mode of operation will be described. It is assumed that the audio information recorded or transferred upon the endless tape 114 be reproduced N times. That is, N pulses are entered through the terminal 23 into the counter or subtractor 23. The flip-flop 25 is set so that the set output signal from the output terminal 23 into the counter or subtractor 23. The flip-flop 25 is set so that the set output signal from the output terminal $25_3$ is fed into the amplifier 11 through the lines 31 and 12 so as to energize the plunger 10. In consequence, the lever 9 is attracted by the plunger 10 so that the belt 8 is tensioned and the power is transmitted from the drive pulley 6 to the pull-down cam 7. The film strip 4 is now transported intermittently in the direction indicated by the arrow *by the claw C which reciprocates in the directions indicated by the double-pointed arrow A as shown in FIG. 3. In consequence the video informations* $4_1$, $4_2$ *and so on are projected continuously upon a screen (not shown) by the optical projection system including the light source S, and the lenses* $L_1$ *and* $L_2$. In the reproduce head, the film strip 4 is now transported at a constant speed by means of the capstan or rotary stabilizer drum $D_1$ and the pressure roller $D_2$ and the audio information recorded upon the magnetic sound track Tr upon the film strip 4 and associated with the video informations $4_1$, $4_2$ and so on is reproduced through the reproduce head 5, amplifiers 17 and 18 and loudspeaker 20. Thus both of the audio and video informations are reproduced simultaneously.

When a video information or picture which the students or trainees want to investigate more closely and for a longer time, the inventive apparatus is switched from its continuous-projection position to its still-picture-projection position by the control unit 2. In response to this switching, a trigger pulse is applied to the terminal 30 so as to reset the flip-flop 25. In consequence the plunger 10 is de-energized so as to stop rotating the cam 7 and hence the transportation of the film strip 4. Now the desired picture is being projected still. The audio information was transferred from the sound track on the film strip 4 to the endless tape 114 through the amplifier 19, the realy 13 and the record-reproduce head 116 while the audio information was reproduced.

When the flip-flop 25 is reset, the flip-flop 33 is set so that the movable contacts 13c -14 13c'' and 37c and 37c' are made in contact with the fixed contacts 13b, 13b', 13b'', 37b and 37b' respectively. The audio information transferred upon the track $142_2$ of the endless tape 114 is now reproduced through the record-reproduce head 116, the contacts 13c' and 13b' and 13b and 13c, the amplifier 17 and 18 and the loudspeaker 20.

The trigger pulse applied to the terminal 30 also drives the monostable multivibrator 26 into the transition state so that the oscillator 27 is actuated so as to record a square waveform control signal upon the control signal track of the endless tape 114 through the amplifier 28.

Upon actuation of the relay 36 the movable contact c is made in contact with the fixed contact b, the control signal pulse thus recorded is reproduced through the record-reproduce head 116' every time the endless tape 114 makes one revolution and is applied to the subtractor 23. When the endless tape 114 completes the Nth revolution, the content of the subtractor 23 becomes zero so that the trigger pulse is generated by the trigger pulse generator 24 and is applied to the flip-flop 25 to thereby set it. Until the flip-flop 25 is again set in the manner described above, the still picture is projected and the associated audio information is reproduced through the loudspeaker 20. In other words, the audio information recorded upon the endless tape 114 may be reproduced N times while the desired picture or video information is projected still for closer observation.

When the flip-flop 25 is set again after the audio informations upon the endless tape 114 have been reproduced N times, the plunger 10 is energized again so that the film strip 4 may be intermittently advanced again to thereby project the pictures or video informations continuously while the associated audio information may be reproduced from the magnetic sound track.

From the above description, it is seen that the inventive apparatus may be automatically switched from the position in which the desired picture is projected still while the associated audio information is repetitively reproduced to the position in which the pictures are continuously projected while the associated audio information is reproduced sequentially.

So far the present invention has been described as being applied to the so-called sound projector having the mechanism for permitting the still picture projection, but it will be understood that the present invention may be also applied to other audiovisual aids such as a slide projector used in conjunction with a magnetic tape recorder, a video tape recorder and the like.

From the foregoing description it is seen that the present invention has a very important advantage in the audiovisual education or instruction that a desired picture may be projected still while the associated audio information may be repetitively reproduced. Upon completion of the desired number of reproductions of the audio information the apparatus in accordance with the present invention may be automatically switched to its normal operating position in which the pictures may be continuously displayed while the associated audio information is reproduced. The apparatus in accordance with the present invention is advantageous not only in the audiovisual education or instruction but also in many TV broadcasting stations.

We claim:

1. An apparatus for presenting audio and visual informations of the type capable of displaying selectively a series of continuous pictures or a still picture and reproducing audio informations associated with said displayed picture or pictures, an improvement comprising means for reproducing video information recorded upon a video information recording medium, said means including a first switching means for selectively permitting the reproduction of a series of continuous pictures or a single still or stationary picture.

means for reproducing audio information associated with said reproduced pictures and recorded upon an audio information recording medium and for transferring thus reproduced audio information upon an endless magnetic recording medium, means for selectively reproducing either of the audio information upon said recording medium or the audio information transferred upon said endless magnetic recording medium, said audio information reproducing means having a second switching means for selecting either of said two audio information reproductions, and control means coupled to said audio information transfer means and said first and second switching means for applying them the control signals for controlling said switchings, said control means being such that when the continuous picture display operation is switched to the still picture display operation, said control means actuates said first and second switching means so that said picture reproduction means may display a still picture while said audio information reproduction means may reproduce the audio information transferred upon said endless magnetic recording medium by said second switching means.

2. An apparatus according to claim 1, wherein said picture recording medium and said audio information recording medium are the common recording medium.

3. An apparatus according to claim 2, wherein a series of a still pictures are continuously recorded upon said common recording medium while the audio information associated with said pictures are recorded upon said common recording medium in such a way that said associated audio information may be reproduced simultaneously when said pictures associated with said audio information are reproduced.

4. An apparatus according to claim 3, wherein said series of still pictures are optically recorded upon said common recording medium while said associated audio information is magnetically recorded upon said common recording medium.

5. An apparatus according to claim 1, wherein said control means comprises a counter, a detector connected said counter means for detecting the content thereof, and a control signal generating circuit connected to said detector means for generating a switching control signal in response to the detection of said detector means, said counter means counting the number of revolutions of said endless magnetic recording medium, said detecting means generating the output signal when said counter means counts the specified number so as to apply the output signal to said control signal to said control signal generating circuit, said control signal generating circuit being connected to said first and second switching means so as to actuate them in response to the generation of the control signals, thereby reproducing continuous pictures and the audio information recorded upon said audio information recording medium.

6. An apparatus according to claim 5, wherein said control means further comprises a recording circuit including a magnetic transducer means which is adapted to record upon said endless magnetic recording medium a signal to be counted in synchronism with the actuation of said first switching means for switching the continuous-picture-display operation to the still-picture-display operation, and a signal reproduction circuit including a magnetic transducer means for reproducing said signal to be counted, recorded upon said endless magnetic recording medium and applying this reproduced signal to said counter means so that upon said switching from said continuous-picture-display operation to said still-picture-display operation, said signal to be counted, recorded upon said endless magnetic recording medium is reproduced and the number of revolution of said endless magnetic recording medium is counted by said counter means, whereby said first and second switching means are actuated by said control signal generating circuit when the content of said counter means reaches the specified number.

7. An apparatus according to claim 6, wherein said counter means has a subtraction input terminal and an addition input terminal so that when said first switching means is so actuated to switch said continuous-picture display operation to said still-picture-display operation, pulses corresponding in number to the number of revolutions of said endless magnetic recording medium are applied to said addition input terminal, while the output of said signal reproducing circuit is connected to said subtraction input terminal, and said detection means detects the specified number zero in said counter means so as to actuate said first and second switching means.

* * * * *